US012585656B2

(12) United States Patent (10) Patent No.: US 12,585,656 B2

Giovanardi et al. (45) Date of Patent: Mar. 24, 2026

(54) MULTIDIMENSIONAL ANALYSIS OF COMMUNICATION RECORDS USING LLMS

(71) Applicant: Zoom Video Communications, Inc., San Jose, CA (US)

(72) Inventors: Davide Giovanardi, San Jose, CA (US); Bilung Lee, Irvine, CA (US); Renjie Tao, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 15 days.

(21) Appl. No.: 18/610,887

(22) Filed: Mar. 20, 2024

(65) Prior Publication Data

US 2025/0298804 A1     Sep. 25, 2025

(51) Int. Cl.
| | |
|---|---|
| *G06F 16/3329* | (2025.01) |
| *G06F 16/242* | (2019.01) |
| *G06F 16/2455* | (2019.01) |
| *H04L 12/18* | (2006.01) |

(52) U.S. Cl.
CPC .... *G06F 16/24565* (2019.01); *G06F 16/2428* (2019.01); *G06F 16/3329* (2019.01); *H04L 12/1831* (2013.01)

(58) Field of Classification Search
CPC ............. G06F 16/3322; G06F 16/3329; G06F 16/685; G06F 16/7844
See application file for complete search history.

(56) References Cited

U.S. PATENT DOCUMENTS

| | | | |
|---|---|---|---|
| 2007/0027844 A1* | 2/2007 | Toub .................... | G11B 27/322 |
| | | | 707/E17.103 |
| 2015/0286718 A1* | 10/2015 | Wang ..................... | G06F 16/93 |
| | | | 707/738 |
| 2016/0275945 A1* | 9/2016 | Elisha ................... | G06F 16/638 |
| 2019/0340193 A1* | 11/2019 | Tucey ................... | G06F 16/438 |
| 2020/0356630 A1* | 11/2020 | Silverstein .......... | G06F 16/3329 |
| 2022/0335225 A1* | 10/2022 | Grammer ................ | G06F 40/35 |
| 2023/0115098 A1 | 4/2023 | Miller et al. | |
| 2024/0386883 A1* | 11/2024 | Darla ................... | G06F 40/216 |

OTHER PUBLICATIONS

International Search Report and Written Opinion for PCT/US2025/019118 mailed May 8, 2025.

* cited by examiner

*Primary Examiner* — Robert W Beausoliel, Jr.
*Assistant Examiner* — Nirav K Khakhar
(74) *Attorney, Agent, or Firm* — Kilpatrick Townsend & Stockton, LLP

(57)     ABSTRACT
One example method includes receiving a set of communication records, the set of communication records representing one or more communications between a first person and a second person; receiving a user query, the user query comprising one or more constraints; generating a plurality of segments from the communication records, at least a subset of the plurality of segments based on the one or more constraints; selecting one or more segments based on the one or more constraints; generating one or more queries based on the one or more constraints; providing, to a trained large language model, the one or more selected segments and the one or more generated queries; and receiving, from the trained LLM, and outputting a multidimensional analysis of the set of communication records.

17 Claims, 8 Drawing Sheets

500

600

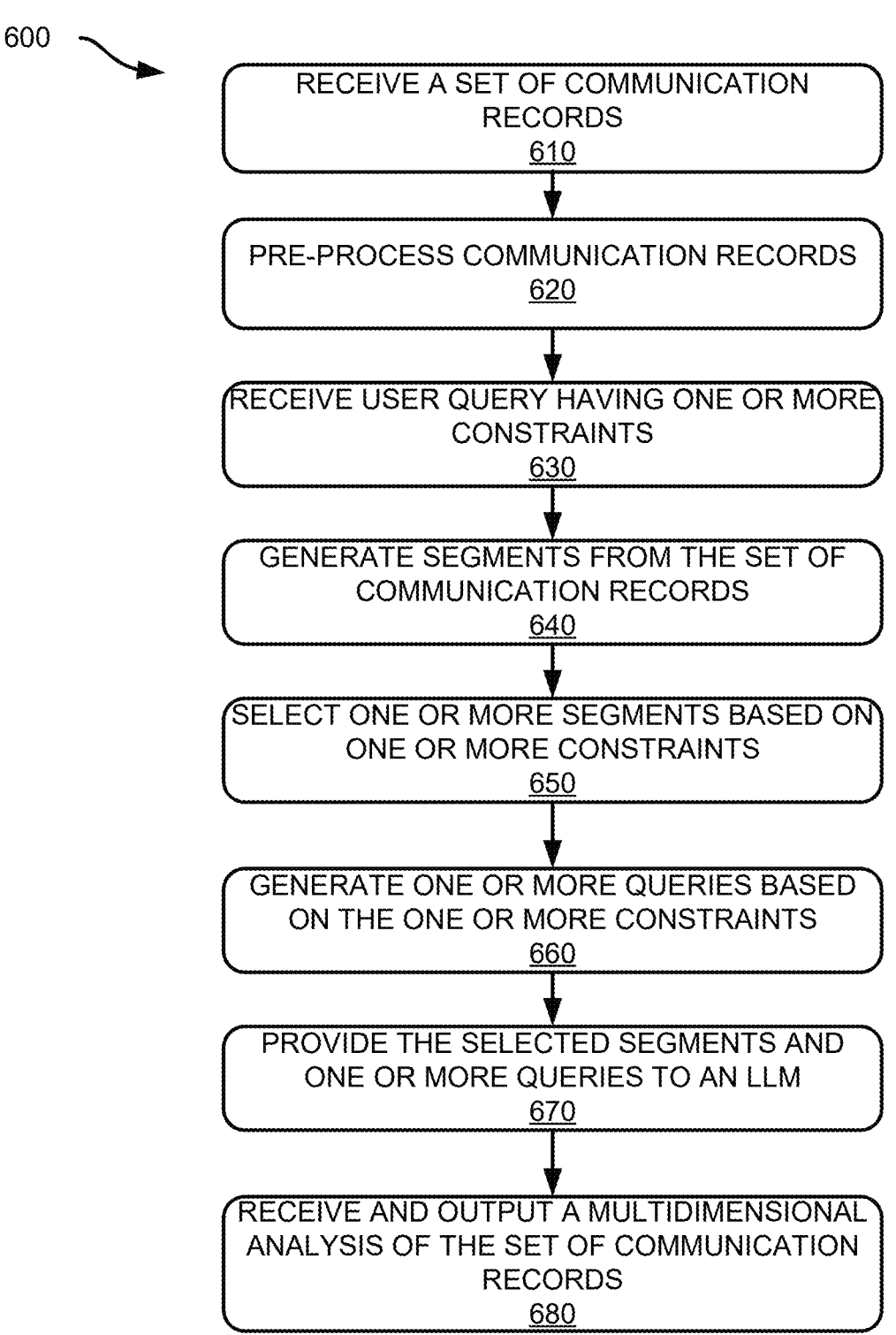

RECEIVE A SET OF COMMUNICATION
RECORDS
610

PRE-PROCESS COMMUNICATION RECORDS
620

RECEIVE USER QUERY HAVING ONE OR MORE
CONSTRAINTS
630

GENERATE SEGMENTS FROM THE SET OF
COMMUNICATION RECORDS
640

SELECT ONE OR MORE SEGMENTS BASED ON
ONE OR MORE CONSTRAINTS
650

GENERATE ONE OR MORE QUERIES BASED
ON THE ONE OR MORE CONSTRAINTS
660

PROVIDE THE SELECTED SEGMENTS AND
ONE OR MORE QUERIES TO AN LLM
670

RECEIVE AND OUTPUT A MULTIDIMENSIONAL
ANALYSIS OF THE SET OF COMMUNICATION
RECORDS
680

*FIG. 6*

MULTIDIMENSIONAL ANALYSIS OF COMMUNICATION RECORDS USING LLMS

FIELD

The present application generally relates to large language models ("LLMs") and more particular relates to multidimensional analysis of communication records using LLMs.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows an example method for multidimensional analysis of communication records using LLMs.

DETAILED DESCRIPTION

Figure 1:
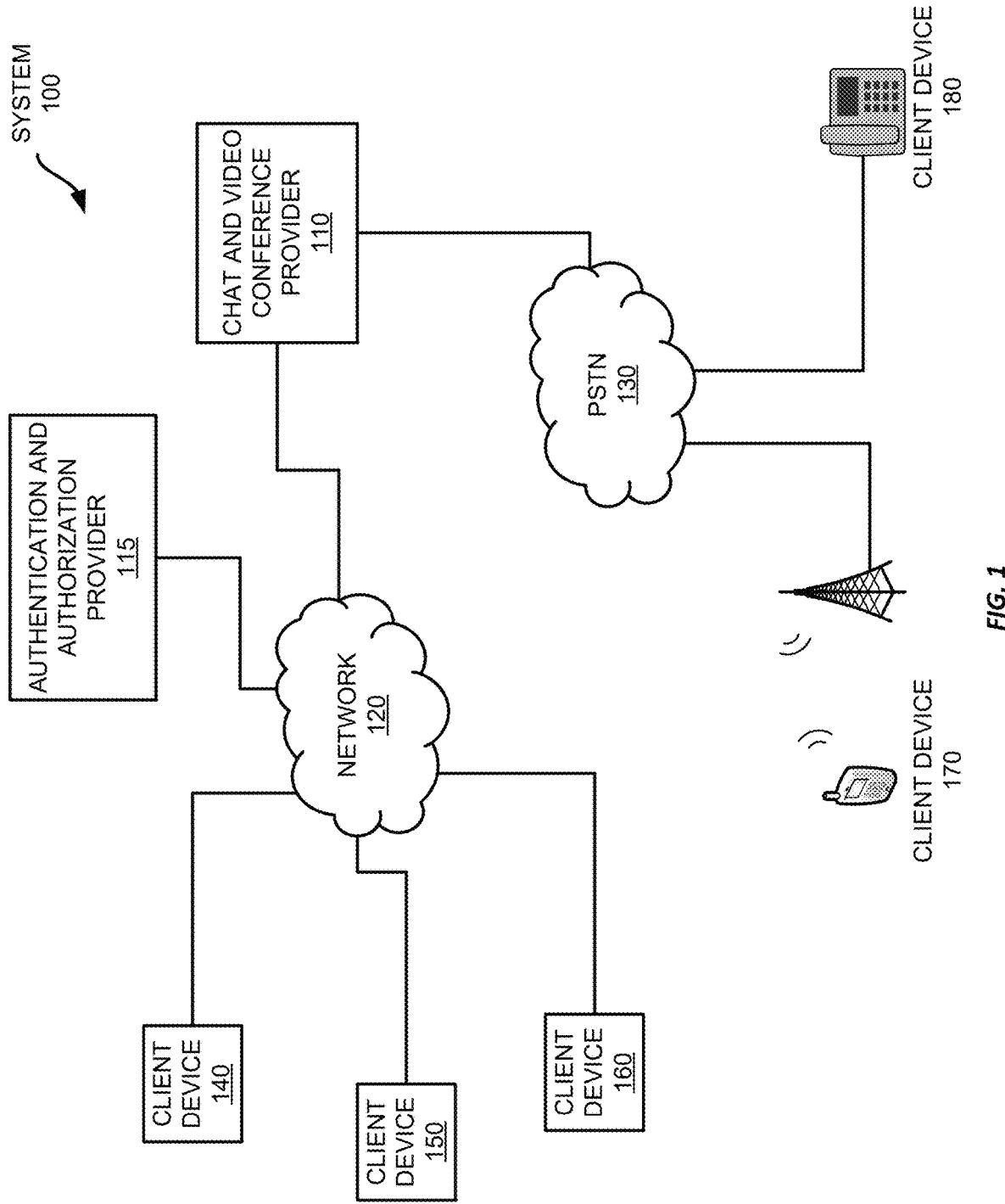
FIGS. 1-2 show example systems for multidimensional analysis of communication records using LLMs.

Examples are described herein in the context of multidimensional analysis of communication records using LLMs. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In modern life, people frequently interact using electronic devices, such as by chat messaging, one-on-one phone calls, or virtual conferences, such as video or telephone conferences. In many cases, such communication channels may be hosted by a virtual conference provider, even in the case of one-on-one phone calls or chat messages. Virtual conference providers may provide enhancements of some of these channels by providing transcripts of a conversation or a conference, either in real-time or after the conclusion of the conference. Real-time transcripts can assist participants who may have difficulty hearing or who do not speak the language(s) used by other participants in the conference. Transcripts can also be used after a conference to review the details of the discussion, which may provide action items or important information to guide work on a project. In some cases, participants may use transcripts of past conferences, chat logs, email chains, or other communications to prepare for an upcoming conference, such as to recall information discussed during the meeting. In other cases, a person may want to obtain a summary of certain aspects of a prior virtual conference or chat discussion, with a summary of the entire conference or discussion.

For example, an individual may have attended a lengthy meeting that covered a variety of topics related to a new product to be released. At a later date, the individual may wish to review some of the discussion in the meeting related to a particular aspect of the product, but not want to review the entire meeting recording or a meeting transcript to find the relevant parts. And while the user can obtain a summary of the entire meeting, they are only interested in certain aspects, making such a fulsome summary excessive. Further, a full summary of the meeting may not provide enough relevant detail for the desired topic.

To help provide a targeted analysis of a prior discussion, whether in a virtual meeting, chat channel, or email chain, a user may wish to provide certain constraints to an artificial intelligence ("AI")-based assistant to enable it to identify relevant portions of the prior discussion and to generate a representation of those relevant portions for the user to review. The representation may be a summary, bullet points, or important topics raised in the relevant portions of the discussion.

To use the AI assistant, the user can provide a query targeting one or more prior communication records. The query includes one or more constraints for the AI assistant to use to identify relevant portions of the communication records, extract those portions from the communication records, and then generate an analysis of those portions according to the constraints provided by the user. To assist with this process, the AI assistant may preprocess the identified communication records to identify certain characteristics, such as a length of the communication records (e.g., a duration for a virtual meeting or a time or date range for chat or email discussions), participants in the communication, topics discussed within the communication records, the type of output to be generated, the level of detail to be included, and other relevant metadata that can be extracted from the communication records. The user can then interact with a dynamically created graphical user interface ("GUI") to select pre-identified candidate constraints, or they can enter their own free-form constraints to be used.

After the user has generated the query, the AI assistant divides the conversation records into smaller segments, such as based on the constraints provided by the user, e.g., by speaker, a particular time block within the meeting, by topic. The AI assistant then identifies a subset of the segments that satisfy one or more of the constraints provided by the user in the query. In this example, the AI assistant uses a trained autoencoder to generate embeddings representing the generated segments and constraints related to the communication records (as opposed to constraints related to the form of the output to be generated). The AI assistant then selects segment embeddings that closely match the constraint embeddings. The AI assistant then generates one or more prompts for an LLM based on the selected segments and the constraints provided by the user. The prompts represent instructions to the LLM regarding how to process the selected segments to generate a particular output. The prompts are then combined and provided to the LLM along with the selected segments to generate the requested analysis of the communication records.

Thus, by leveraging an AI assistant and a LLM, a user can effectively and efficiently analyze the communications between two or more people to target the specific aspects of the communications of interest, but without burdening the user with reviewing the communications themselves for the relevant information.

This illustrative example is given to introduce the reader to the general subject matter discussed herein and the disclosure is not limited to this example. The following sections describe various additional non-limiting examples and examples of multidimensional analysis of communication records using LLMs.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
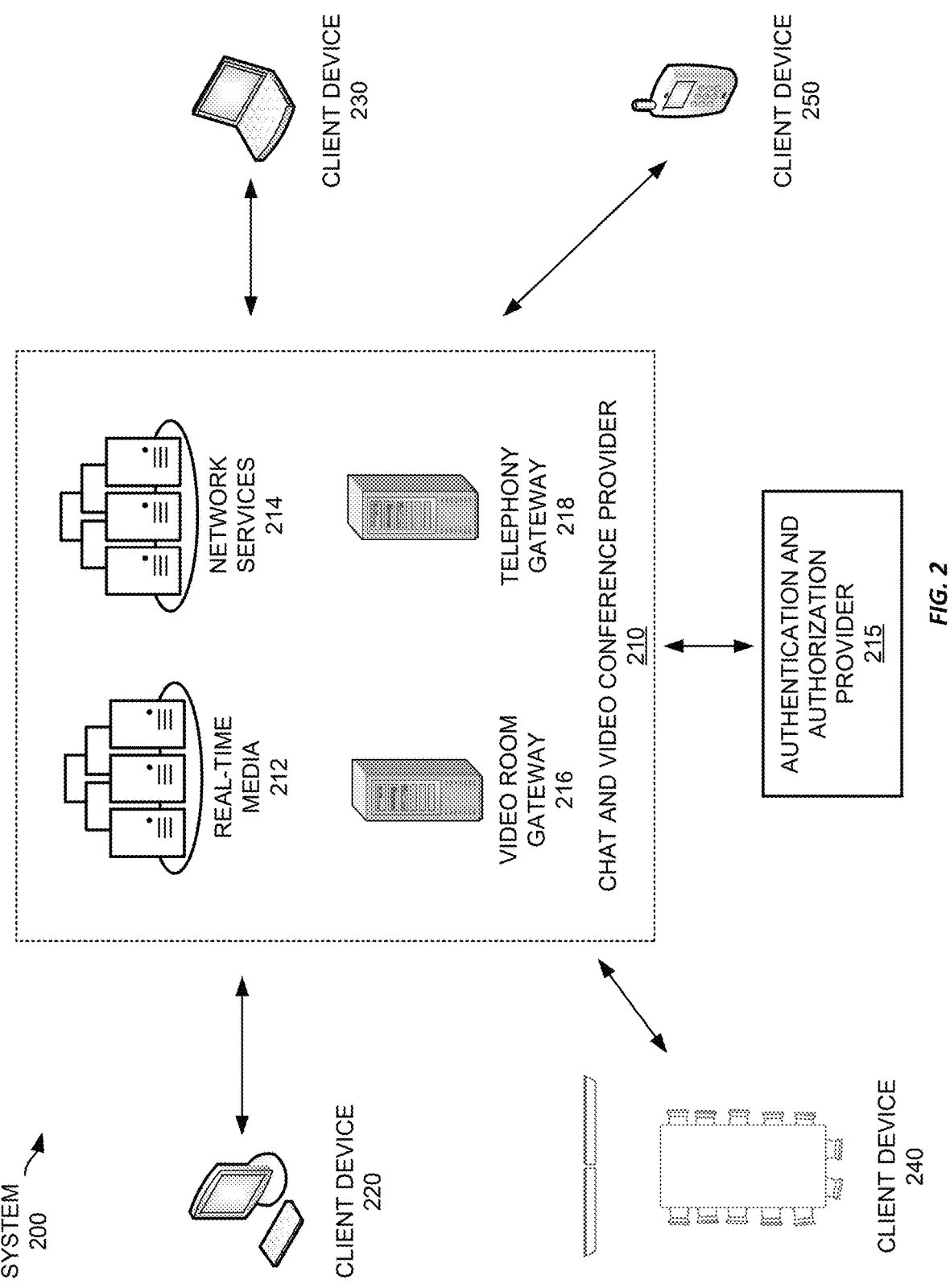

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-

250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
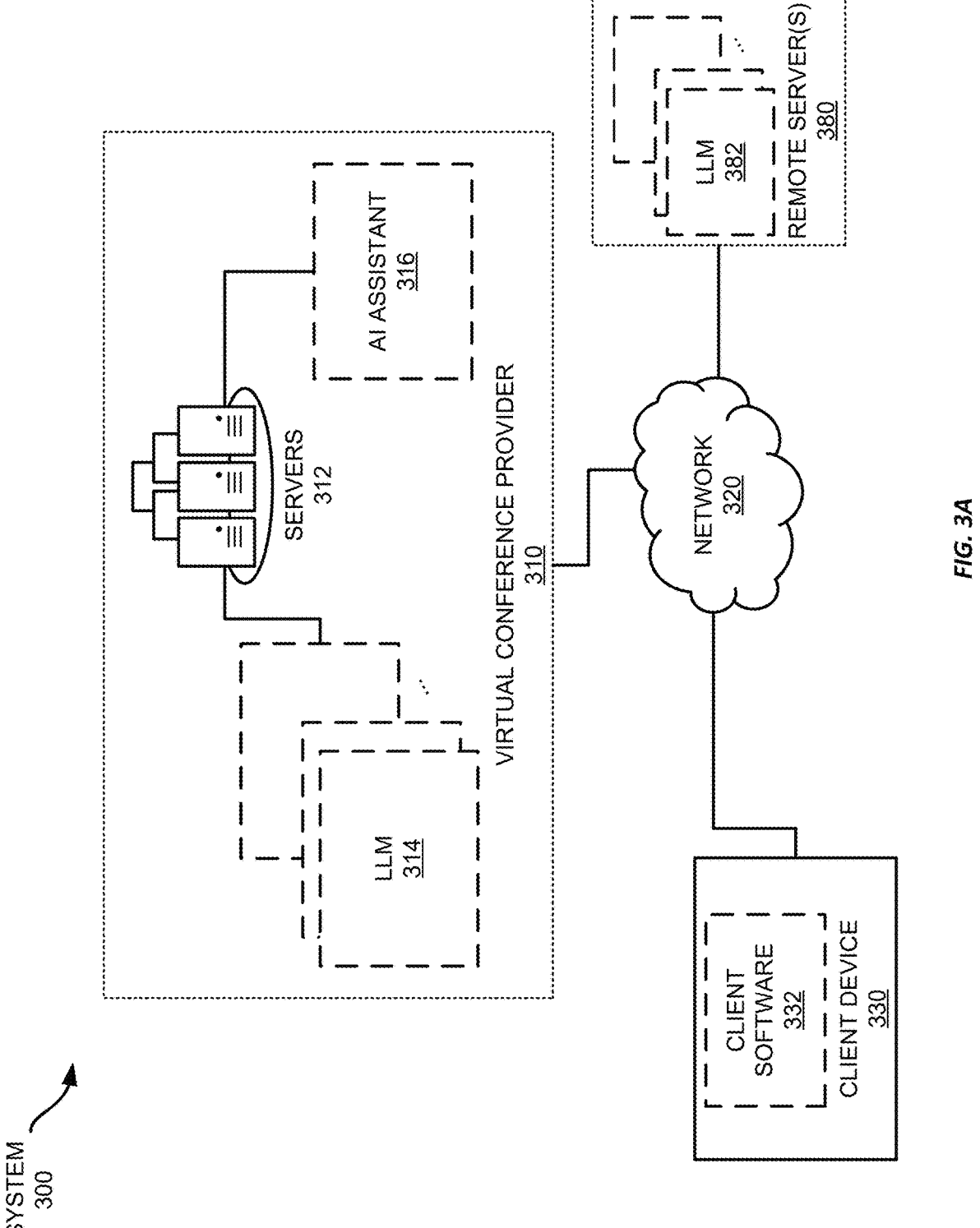
FIGS. 3A-3B show an example system for multidimensional analysis of communication records using LLMs.
Figure 3B:
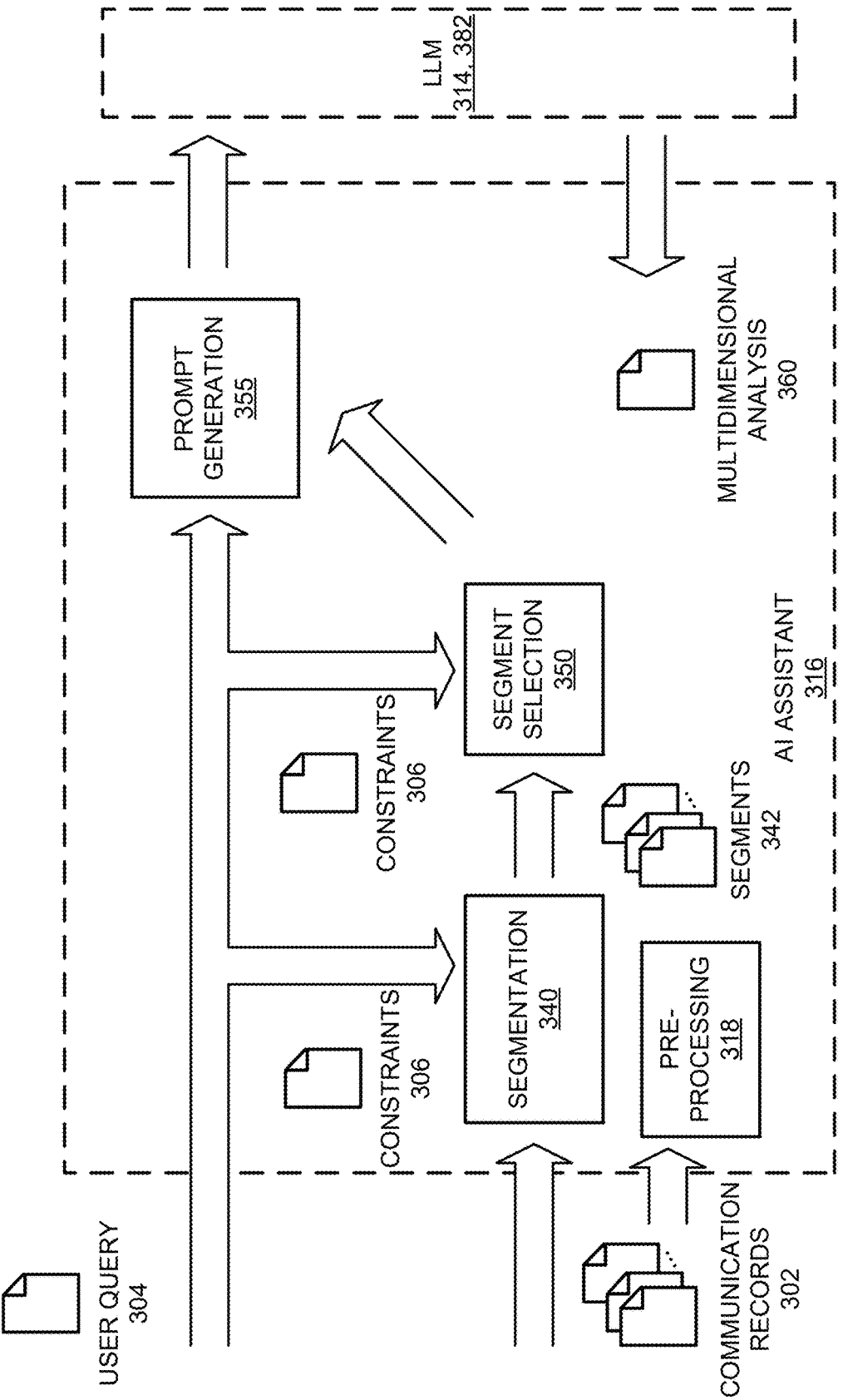

Referring now to FIGS. 3A-3B, FIG. 3A shows an example system 300 for communication analysis using LLMs. In this example, the system 300 includes a client device 330, a virtual conference provider 310, and one or more remote servers 380 that host one or more LLMs 382. In this example, the virtual conference provider 310 provides chat and virtual conferencing capabilities, such as discussed above with respect to FIGS. 1-2, but also provides one or more servers 312 that provide one or more LLMs 314 that may be used to service requests received from users via their respective client device, such as client device 330. In addition, the virtual conference provider 310 provides an AI assistant 316 to allow users to perform multidimensional analysis of communication records using LLMs.

The LLM 314 may be a model that has been trained on a large corpus of data, such as information available from licensed, commercially usable, non-public datasets. For LLMs, the training data may be written materials, such as webpages, documents, emails, or blogs that may be relevant to generating written works.

Examples of LLMs include GPT models of different versions, autoregressive LLMs (e.g., Large Language Model Meta A (LLAMA)), transformer-based autoregressive LLMs (e.g., BigScience Large Open-science Open-access Multilingual Language Models (BLOOMs)), Zephyr, MISTRAL, causal decoder-only models (e.g., Falcon), or MosaicML Pretrained Transformer (MPT) models.

Client devices may execute client software 332 to join and participate in virtual conferences hosted by the virtual conference provider 310. During a virtual conference, the participants can exchange audio and video streams, as discussed above with respect to FIGS. 1-2, to interact with each other, discuss any topics of interest, and share content. The virtual conference provider 310 may then generate a transcript of the virtual conference, either in real-time or based on a recording of the virtual conference. In addition, the participants can continue any discussions outside of a virtual conference, such as by using chat functionality provided by the virtual conference provider. They may also email each other using email services provided by the virtual conference provider 310 or another third party. Thus, the participants may generate one or more communication records relevant to various topics of discussion. While the discussion below will be with respect to analysis of sets of communication records, it should be appreciated that it is equally applicable to analysis of a single communication record, such as a single virtual conference transcript.

To employ the AI assistant 316, a user of the client device 330 can interact with a GUI to provide a query that includes one or more constraints to the AI assistant 316 and identifies one or more communication records. The AI assistant then deconstructs the communication records into a set of segments, from which it selects segments that are relevant to the constraints in the user query. The AI assistant then generates one or more instructions (or prompts) for an LLM based on the user's query and its constraints. The AI assistant then provides the selected segments and the instructions to an LLM 314, 382 to generate an analysis in a form specified by the user. It should be appreciated that while in this example, the AI assistant 316 is provided by the virtual conference provider 310, in some examples, the client software 332 includes an integrated AI assistant 316 or a separate AI assistant 316 may be executed by the client device. Further, in some examples, an AI assistant 316 may be provided by one or more remote servers 380.

Referring now to FIG. 3B, FIG. 3B shows an example AI assistant 316 for multidimensional analysis of communication records using LLMs. In this example, the AI assistant is executed by the virtual conference provider 310, but as discussed above, the client device 330 or a remote server 380 may execute the AI assistant 316. The AI assistant 316 includes segmentation functionality 340, segment selection functionality 350, and prompt generation functionality 355. In addition, the example AI assistant 316 includes pre-processing functionality 318.

To perform multidimensional analysis of one or more communication records 302, the AI assistant 316 receives a user query 304, which includes one or more constraints 306, and access to one or more identified communication records 302. In some cases, the communication records 302 may be received with the user query 304, a location of the communication records 302 may be received, or a combination. The user query 304 may include one or more constraints, which may be of several types, and provide the multiple dimensions to the query needed to target the specific portions of the communications records that are of interest. For example, a constraint may be a constraint related to the content of the communication itself, such as a particular time or duration within the communication, a particular person, or a particular topic discussed. Constraints may also be related to particular domains or other metadata that is not contained within the communication itself, such as a particular speaker's role within the communication, e.g., a salesperson or a client, or within a company, e.g., a team lead, a project lead, or an executive, a confidentiality level of a communication, or identification of people as internal or external participants. Finally, formatting constraints may be related to the construction of the analysis output, such as a style (e.g., formal, casual, or bullet points), a desired length of the output, or a level of sophistication for the target audience of the output (e.g., lay person or subject matter expert).

In some examples, constraints may be explicitly identified as constraints. For example, a user may interact with a GUI window that includes various selections that can be used to tailor a query. Thus, each of the selections may be identified as a constraint and as a particular type of constraint. In some examples, a user query may be a free-form text field. In some such examples, the user query may be provided to a trained ML model, such as an LLM 314, 382, with an instruction to identify constraints within the query and the corresponding types of those constraints.

As discussed above, along with the user query 304, one or more communication records 302 are provided to the AI assistant 316. The communication records 302 may be stored and maintained by the virtual conference provider 310 or another computing device, such as the client device 330 or a remote server 380. As discussed above, communication records 302 may include virtual conference transcripts, chat logs from one or more chat channels or chat messages exchanged during a virtual conference, emails, calendar information, documents, or other written record or communications.

After obtaining the communication records, the AI assistant 316 segments the communication records 302 to enable it to identify relevant portions of for analysis. In this example, the AI assistant employs a trained machine learning ("ML") model as a part of the segmentation functionality 340 to segment the communication records 302 according to at least some of the constraints contained in the user query 304. For example, the segmentation functionality 340 may employ the LLM 314, 382 to perform segmentation. In this example, the trained ML model is provided a communication record from the set of communication record and content-based constraints, such as constraints relating to topics, speakers, and particular time ranges. For example, if the user query is "provide me with a summary of John's comments about compensation from the last 20 minutes of the meeting," the constraints related to the speaker (John), the topic (compensation), and relevant part of the meeting (the last 20 minutes) are provided to the trained ML model along with the communication record. The trained ML model can thus analyze only the relevant content within the communication records, e.g., within the last 20 minutes and generate segments accordingly. In this example, the segmentation functionality may generate segments for all content during the last 20 minutes of the meeting, while not assessing relevance to other aspects of the query, which may instead be addressed by the segment selection functionality 350. It may then generate segments that have communications from John without regard to timing, followed by segments related to compensation without regard to speaker. Thus, segmentation may be performed on individual constraints. Though in some examples, multiple constraints may be applied simultaneously to generate segments.

The generated segments for audio conferences, such as in the case of a virtual conference transcript, may be individual utterances or may be a sequence of utterances that are made without interruption or that do not exceed some number of words or duration within the communication record (e.g., no more than 60 seconds). For written communications, segments may be sentences or paragraphs or individual chat messages, whether complete sentences or not.

After the AI assistant 316 has generated the segments 342, they are provided to the segment selection functionality 350 for analysis. In this example, the segment selection functionality 350 employs a trained ML model, such as a trained autoencoder, a trained predictor model, or any other variety of trained neural network, to generate binary embeddings for each of the constraints 306 and for each segment 342. The binary embeddings may be generated based on the entirety of a constraint 306 or segment 342, or multiple embeddings may be generated for each based on individual words, phrases, sentences, or other portions of the constraint 306 or segment 342. The binary embeddings are then used to select one or more relevant segments. In this example, the segment selection functionality 350 analyzes each constraint embedding against each segment embedding to determine a similarity score for the embeddings. If the similarity score satisfies a predetermined threshold, the segment is determined to be related to the constraints. Otherwise, the segment is determined to be not related to the constraint. Through this process, relevant segments are selected.

It should be appreciated that because multiple constraints are employed, segments may be closely related to some constraints (e.g., topic and time), but not closely related to other constraints (e.g., an identified person). However, if the similarity scores satisfy the predetermined threshold, such a segment may be selected. For example, as discussed above, while John may not be the speaker, the question may be related to the topic and within the correct time period. Thus, it may provide relevant context and is therefore selected. Thus, selecting a particular segment may be based on an aggregation of the scores for the different constraints, e.g., an average score, or if more than a threshold number of constraints are satisfied.

While the example shown in FIG. 3B employs binary embeddings, other techniques may be used to determine relationships between segments 342 and constraints 306. For example, rather than generating binary embeddings using a trained ML model 345, as discussed above, a cross-encoder may be provided with textual inputs representing a constraint and a segment 342. The cross-encoder compares the two textual inputs to determine a similarity between them and outputs a score indicating the level of similarity, e.g., a value between 0 and 1. Thus, the segment selection functionality 350 could employ such a technique to identify segments that are sufficiently related to the various constraints, e.g., the score satisfies a threshold such as 80% or 90%. After analyzing each segment with respect to the constraints, a set of related segments can be generated. And while these techniques represent some ways to determine relevancy for segments, others may be used. For example, the segment selection functionality 350 may employ an LLM to determine the relevance of the segments based on the constraints 306.

In addition to selecting segments that are relevant to the user query 302 based on the constraints, the AI assistant 316 generates one or more queries or prompts to be inputted into the LLM 314, 382 in conjunction with the selected segments. In this example, the AI assistant employs prompt generation functionality 355 to generate prompts to submit constraints and segments to the LLM 314, 382 to generate the analysis of the communication records 302. In this example, the prompt generation functionality 355 generates a prompt requesting that the LLM generate a summary of the selected segments based on the associated constraints and to generate the summary based on any constraints related to the construction of the analysis output provided in the user query 302. For example, the prompt generation functionality 355 may generate a prompt according to a predefined template, such as according to the following format: "Summarize [speaker's] comments about [topic]. The summary should be [formatting constraint] long and use a [formatting constraint] level of complexity." The prompt generation functionality 355 may then provide the prompt and the selected segments to the LLM 314, 382 to evaluate. The LLM 314, 382 then generates the multidimensional analysis 360 of the communication records 302, which is provided to the user. In this example, the multidimensional analysis represents a summary of a targeted portion of the communication records. In other examples, the multidimensional analysis may identify the important topics discussed in the communication records, such as in a bulleted list, or it may identify the most important speakers or the identity of a particular speaker that discussed a particular topic. For example, a user query may be "Identify the person who discussed compensation during the last 20 minutes of the meeting," which may elicit a multidimensional analysis 360 that identifies one or more speakers in the meeting. Thus, the AI assistant provides multidimensional analysis communication records using the LLM 314, 382.

In addition to providing the multidimensional analysis functionality discussed above, the AI assistant 316 may also provide pre-processing functionality 318 to pre-process of the one or more communication records 302 to identify potential dimensions over which to analyze the communication records 302. These identified dimensions can be provided as options to a user who is generating a user query 304 to analyze the one or more communication records 302.

In this example, the pre-processing functionality 318 employs natural language processing ("NLP") to identify topics discussed within the communication record(s) 302, speakers or participants to the communications reflected in the communication record(s) 302, and time intervals within the communication record(s). In some examples, the pre-processing functionality 318 may identify other information based on the communication records, such as roles of the identified speakers or participants. The roles may be roles with respect to the communication, e.g., a vendor and a customer, roles with respect to a particular organization, e.g., team lead, program lead, or executive, or roles with respect to the meeting, e.g., host, presenter, panelist, or audience.

Any suitable NLP functionality may be employed, such as latent semantic analysis or latent Dirichlet allocation to identify topics or other content-based information that may be extracted from the one or more communication records and classify portions of the communications records based on the identified topics or content-based information. Some examples may employ ML-based techniques, including support vector machines ("SVMs") or neural networks, such as deep neural-networks ("NNs") (e.g., recurrent NNs or convolutional NNs).

The identified content-based information, such as topics, speakers or participants, and time intervals may be used to populate a GUI-based query template that the user may interact with to generate a query. In some examples they may be used to identify related information, such as the roles of the participants to the communication record(s) 302.

Figure 4:
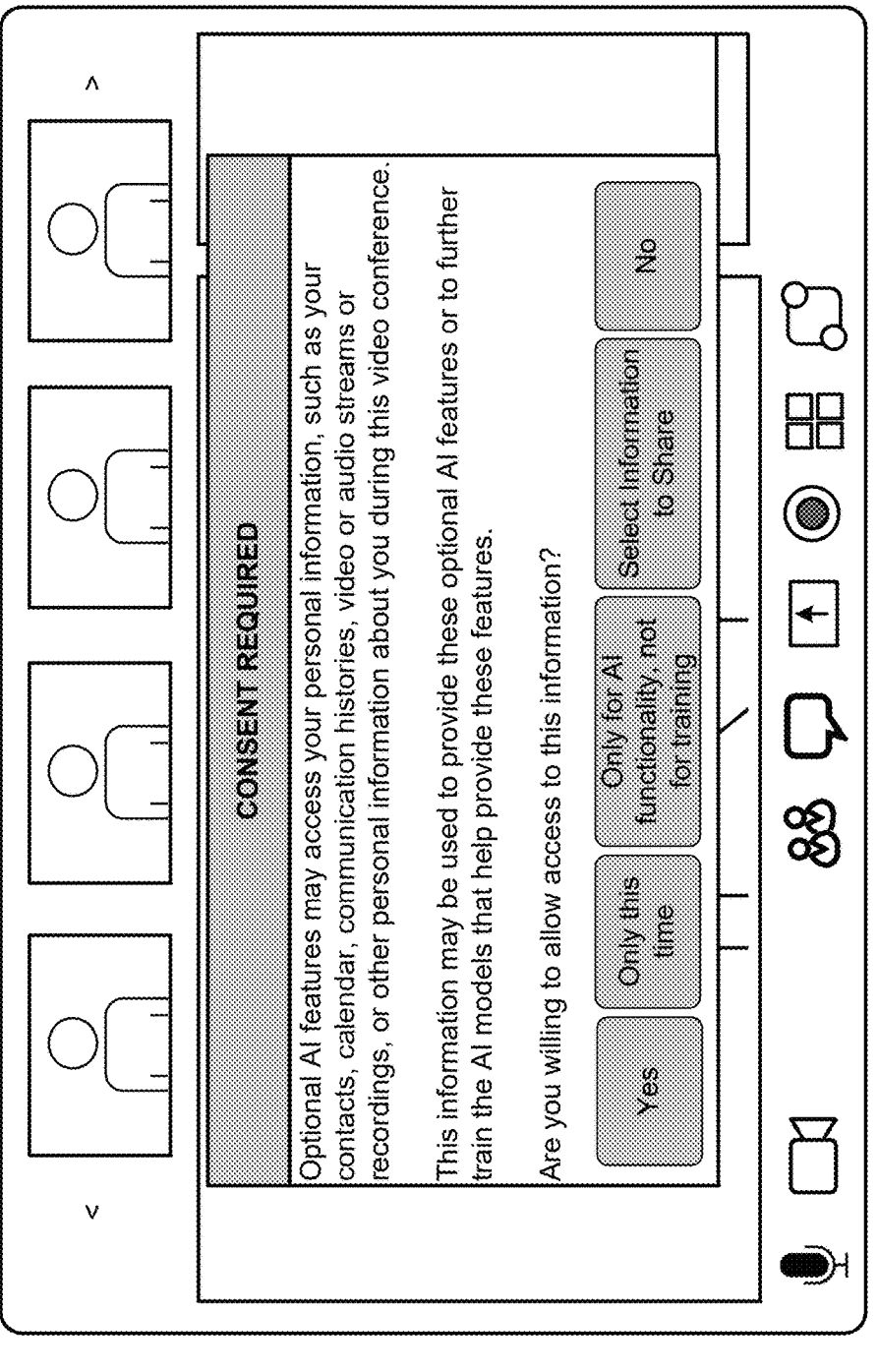
FIGS. 4-5 show example graphical user interfaces for multidimensional analysis of communication records using LLMs.

Referring to FIG. 4, FIG. 4 shows a GUI 400 presenting a consent option to employ certain AI-assisted features. In some examples according to the present disclosure, a user may select an option to use one or more optional AI features available from the virtual conference provider, such as the multidimensional analysis of communication records as described herein. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available to the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

As can be seen in FIG. 4, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 5:
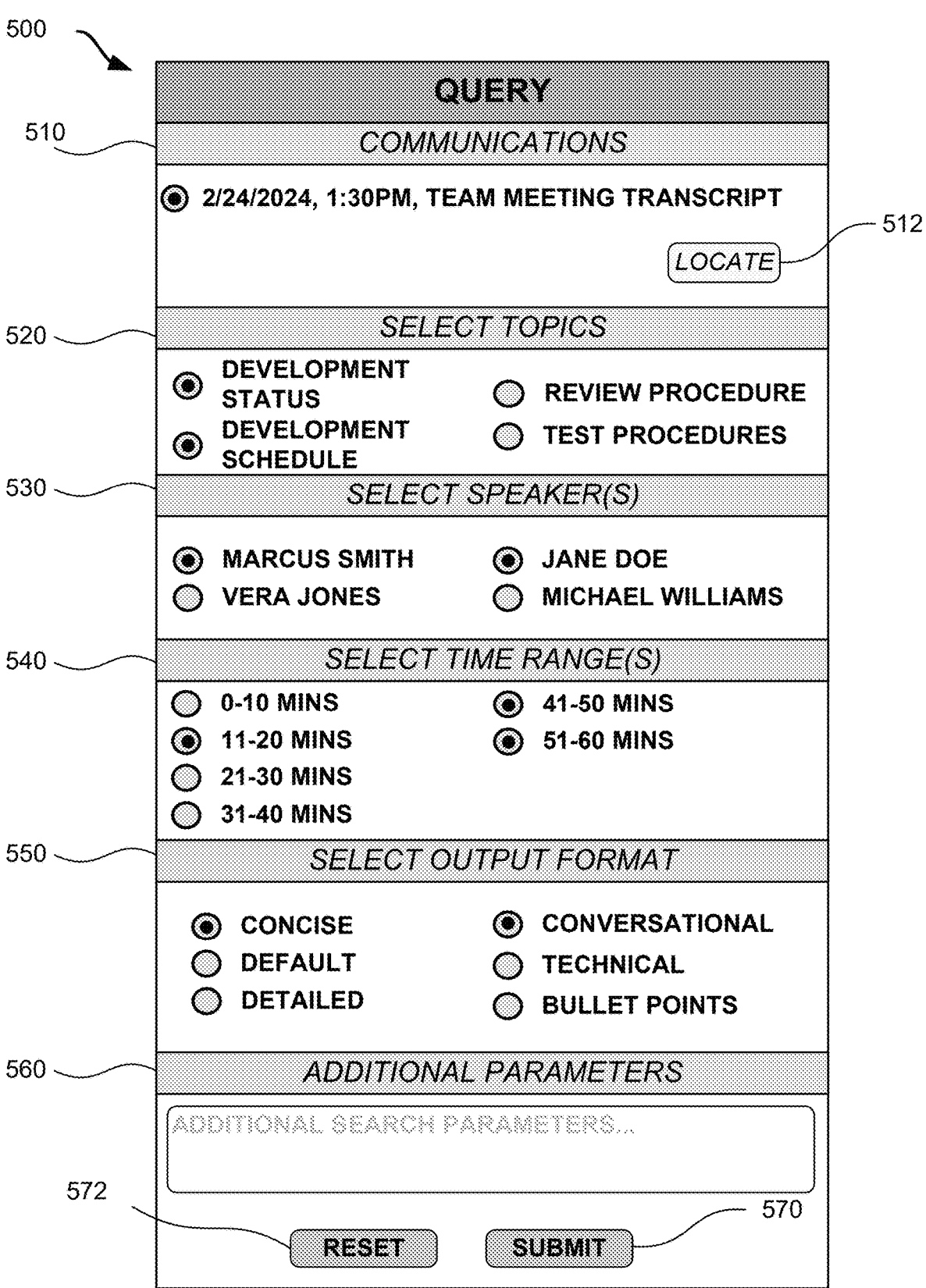

Referring to FIG. 5, FIG. 5 shows an example view of a GUI window 500 that provides selectable query options for multidimensional analysis of communication records using LLMs. In this example, the user is presented with a variety of options that may be used to generate a multidimensional analysis of one or more communication records. The user has selected a particular communication records—a transcript—to analyze but may also select the "locate" button 512 to identify any additional communications to be included in the analysis. In this example, the locate button 512 allows the user to browse any available meeting transcripts, chat channels, email inboxes, collaborative documents, or other textual records for analysis.

Based on the selected communications, the GUI window 500 presents the user with additional options. As discussed above, the multidimensional analysis of communication records may involve pre-processing the communication records 302 to identify content-based information, such as topics discussed, speakers or participants to the communication records, time ranges, or other information. Thus, after employing the pre-processing functionality 318, the AI assistant 316 can generate and provide a GUI window 500 that identifies various options based on the pre-processing, such as topics 520, speakers 530, and time ranges 540. Other options, such as roles may also be displayed in some examples. In addition, the GUI window 500 allows the user to select an output format for the multidimensional analysis. In this example, the user has selected a concise output format that employs a conversational tone.

Finally, the GUI window 500 provides an option for the user to provide any additional parameters or instructions to the LLM 314, 382 to accompany the query 304. The instructions may specify any suitable constraints 306 or other requirements that the LLM 314, 382 should employ when performing the multidimensional analysis. The user may then select the "submit" button 570 to submit the query 304 to the AI assistant 316 for multidimensional analysis. The user may instead select the reset button 572 to reset all of the selections that may have been made.

Referring now to FIG. 6, FIG. 6 shows an example method 600 for multidimensional analysis of communication records using LLMs. The method 600 will be described with respect to the system 300 shown in FIGS. 3A-3B and the GUI window 500 shown in FIG. 5; however, it should be appreciated than any suitable system or GUI window according to this disclosure may be employed for example methods according to this disclosure. Moreover, while the discussion above and herein is in the context of a virtual conference provider, it should be appreciated that any service provider may be employed, or the functionality may be performed by a user's own client device.

At block 610, the AI assistant 316 receives a set of communication records representing one or more communications between a first person and a second person. In this example, the set of communication records is a single transcript of a virtual conference between multiple people. However, in some examples a set of communication records may include multiple transcripts, chat messages, email messages, direct messages, or other electronic communications, or any combination of these, between two or more individuals. Further, each communication record need not include all of the individuals. Instead, different subsets of individuals may participate in the communications represented by the different communication records in the set.

In this example, the AI assistant 316 receives the communication records from a user as one or more files containing the communications between the individuals. However, in some examples, the AI assistant 316 may receive a uniform resource identifier ("URI"), such as a uniform resource locator ("URL"), that identifies a name and location of a communication record. Such communication records may be located on a client computer 330, at a virtual conference provider 310, or at one or more remote servers 380 or other computing device(s). The AI assistant 316 may then retrieve or otherwise access the communication record (s) using such information.

At block 620, the AI assistant 316 may pre-process the received communication record(s) using its pre-processing functionality 318, generally as described above with respect to FIG. 3B. In this example, the AI assistant 316 employs NLP or a trained ML model to identify one or more constraints within the communication records, such as topics, speakers or participants, or time periods within the communication records. The identified constraints may be used to dynamically construct a GUI window 500 to provide the user with one or more pre-populated options that may be included in a query 304 to the AI assistant 316. It should be appreciated that pre-processing may be optional in some examples. For example, a user may be presented with an option to pre-process the set of communication records. In some examples, the AI assistant 316 may not include pre-processing functionality 318.

At block 630, the AI assistant 316 receives a user query 304 that includes one or more constraints 306. As discussed above with respect to FIG. 3B, a user may submit a query 304 of any kind regarding the set of communication records. In this example, the user interacts with the GUI window 500 to establish constraints for a query, both on the analysis via content- or domain-specific constraints, or on the output, based on one or more format constraints. In this example, the user may select one or more pre-populated constraint options or may enter their own constraints via the free-form additional parameter option 560. However, in some examples, the user may compose a user query without such options, such as by entering all desired constraints within a text input window, such as the additional parameters 560 text input window.

At block 640, the AI assistant 316 generates one or more segments, generally as discussed above with respect to FIG. 3B. As discussed above, segments may be generated based on content-based constraints, such as topics, speakers, or time periods, or they may be generated based on domain-based constraints, such as roles of different participants. In some examples, segments may be generated based on sentences, all successive utterances made by a speaker before a different speakers begins talking, or other criteria. Still other approaches to generating segments may be employed that can enable identifying content within the set of communication records relevant to the user query.

At block 650, the AI assistant 316 selects one or more segments based on the one or more constraints, generally as discussed above with respect to FIG. 3B. Selected segments include those that are directly responsive to one or more constraints or other aspect of the user query. In addition, some segments may be selected based on temporal proximity or semantic relevance to previously selected segments. For example, one segment may be selected based on its relevance to one or more constrains, while another segment that would not have otherwise been selected based on relevance to a constraint may be selected based on its temporal or semantic relevance to the selected segment.

Temporal relevance may include a short time period preceding and following a selected segment that may provide context for the selected segment. For example, after a first segment is selected, the AI assistant 316 may select a segment immediately preceding the first segment. The AI assistant 316 may infer that a preceding segment, which was near in time to the selected segment, may provide some transition context regarding a change in topic or a reference to a new document or slide in a presentation that does not directly relate to a constraint, but may provide helpful context to the LLM. Similarly, if a second segment is selected, a segment immediately preceding or following the second segment may be selected if it provides semantic information relevant to the second segment. For example, after selecting a segment, the AI assistant may analyze the immediately preceding or following segment (or both) to determine a semantic similarity between the two segments. If the similarity satisfies a threshold, the segment may also be selected, even if it was not initially selected based on the one or more constraints. Thus, the AI assistant 316 may select segments based on the one or more constraints but may also select one or more additional segments based on the selected segments.

At block 660, the AI assistant 316 generates one or more queries based on the one or more constraints, generally as discussed above with respect to FIG. 3B. In this example, the user has provided an additional parameter to generate a summary of the topics selected using the GUI window 500 in FIG. 5, along with the other constraints. To generate the one or more queries, the prompt generation functionality 355 may select a template query used when a "summary" is requested. Similarly, it may select a template query based on other constraints provided by the user, such as "identify" queries (e.g., "identify the three most important development schedule milestones"). Because a user query may involve many different constraints, one or more different templates may be selected. In some examples, the LLM 314, 382 may be employed to generate on or more queries, such as by providing a request to the LLM 314 to generate one or more queries based on the constraints provided by the user. Still other techniques may be employed.

At block 670, the AI assistant 316 provides the selected segments and the one or more queries to the LLM 314, 382, generally as discussed above with respect to FIG. 3B.

At block 680, the AI assistant 316 receives and outputs a multidimensional analysis of the set of communication records as received from the LLM 314, 382. In this example, the AI assistant 316 outputs the multidimensional analysis to a GUI window, but in some examples, the AI assistant 316 may post the analysis to a chat channel, transmit the analysis as a direct message to the user, generate an email containing the multidimensional analysis, or any other suitable medium for conveying the analysis to the user.

Figure 7:
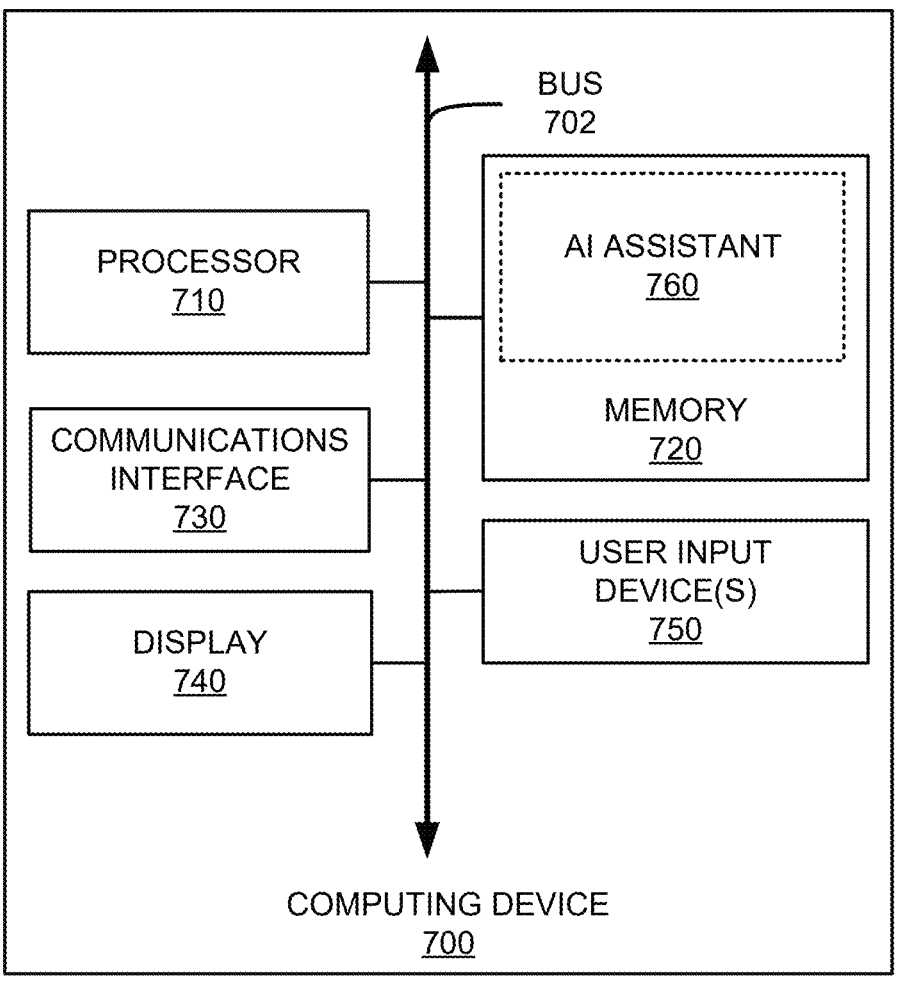
FIG. 7 shows an example computing device suitable for use with example systems and methods for multidimensional analysis of communication records using LLMs.

Referring now to FIG. 7, FIG. 7 shows an example computing device 700 suitable for use in example systems or methods for multidimensional analysis of communication records using LLMs according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for multidimensional analysis of communication records using LLMs according to different examples, such as part or all of the example method 600 described above with respect to FIG. 6. Suitable example computing devices 700, such as user client devices, may also include one or more user input devices 750, such as a keyboard, mouse, touchscreen, microphone, etc., to accept user input. The computing device 700 also includes a display 740 to provide visual output to a user. In addition, the computing device 700 includes an AI assistant 760, such as discussed above with respect to FIGS. 3A-3B.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving a set of communication records, the set of communication records representing one or more communications between a first person and a second person;
   receiving a user query, the user query comprising one or more constraints;
   generating a plurality of segments from the communication records, at least a subset of the plurality of segments based on the one or more constraints;
   generating, using an autoencoder, segment embeddings for each segment of the plurality of segments and constraint embeddings for each constraint of the one or more constraints; and
   selecting one or more segments based on the one or more constraints based on determined similarities between segment embeddings and constraint embeddings;
   generating one or more queries based on the one or more constraints;
   providing, to a trained large language model ("LLM"), the one or more selected segments and the one or more generated queries; and
   receiving, from the trained LLM, and outputting a multidimensional analysis of the set of communication records.

2. The method of claim 1, wherein selecting the subset of segments comprises:
   for each constraint:
     for each segment:
       providing, to a cross-encoder for each segment, the respective constraint and respective segment; and
       obtaining a score for the respective constraint and respective segment; and
     associating one or more segments with each constraint based on the respective score.

3. The method of claim 1, further comprising selecting one or more additional segments based on one or more selected segments.

4. The method of claim 1, wherein the one or more constraints comprise one or more of a content constraint, a domain constraint, or a format constraint.

5. The method of claim 1, wherein the one or more communication records comprises one or more of a meeting transcript, a chat log, or an email chain.

6. The method of claim 1, further comprising:
   determining one or more candidate constraints based on the one or more communication records;
   generating a graphical user interface ("GUI") comprising one or more GUI elements corresponding to the one or more determined candidate constraints;

receiving a selection of a subset of the one or more determined candidate constraints; and wherein the one or more constraints comprise the selected subset of the one or more determined candidate constraints.

7. A system comprising:

a non-transitory computer-readable medium; and one or more processors communicatively connected to the non-transitory computer-readable medium, the one or more processors configured to execute processor-executable instructions stored in the non-transitory computer-readable medium to cause the one or more processors to:

receive a set of communication records, the set of communication records representing one or more communications between a first person and a second person;

receive a user query, the user query comprising one or more constraints;

generate a plurality of segments from the communication records, at least a subset of the plurality of segments based on the one or more constraints;

generate, using an autoencoder, segment embeddings for each segment of the plurality of segments and constraint embeddings for each constraint of the one or more constraints; and select one or more segments based on the one or more constraints based on determined similarities between segment embeddings and constraint embeddings;

generate one or more queries based on the one or more constraints;

provide, to a trained large language model ("LLM"), the one or more selected segments and the one or more generated queries; and receive, from the trained LLM, and outputting a multidimensional analysis of the set of communication records.

8. The system of claim 7, wherein the one or more processors are configured to execute further processor-executable instructions stored in the non-transitory computer-readable medium to:

for each constraint:

for each segment:

provide, to a cross-encoder for each segment, the respective constraint and respective segment; and obtain a score for the respective constraint and respective segment; and associate one or more segments with each constraint based on the respective score.

9. The system of claim 7, wherein the one or more processors are configured to execute further processor-executable instructions stored in the non-transitory computer-readable medium to select one or more additional segments based on one or more selected segments.

10. The system of claim 7, wherein the one or more constraints comprise one or more of a content constraint, a domain constraint, or a format constraint.

11. The system of claim 7, wherein the one or more communication records comprises one or more of a meeting transcript, a chat log, or an email chain.

12. The system of claim 7, wherein the one or more processors are configured to execute further processor-executable instructions stored in the non-transitory computer-readable medium to:

determine one or more candidate constraints based on the one or more communication records;

generate a graphical user interface ("GUI") comprising one or more GUI elements corresponding to the one or more determined candidate constraints;

receive a selection of a subset of the one or more determined candidate constraints; and wherein the one or more constraints comprise the selected subset of the one or more determined candidate constraints.

13. A non-transitory computer-readable medium comprising processor-executable instructions configured to cause one or more processors to:

receive a set of communication records, the set of communication records representing one or more communications between a first person and a second person;

receive a user query, the user query comprising one or more constraints;

generate a plurality of segments from the communication records, at least a subset of the plurality of segments based on the one or more constraints;

generate, using an autoencoder, segment embeddings for each segment of the plurality of segments and constraint embeddings for each constraint of the one or more constraints; and select one or more segments based on the one or more constraints based on determined similarities between segment embeddings and constraint embeddings;

generate one or more queries based on the one or more constraints;

provide, to a trained large language model ("LLM"), the one or more selected segments and the one or more generated queries; and receive, from the trained LLM, and outputting a multidimensional analysis of the set of communication records.

14. The non-transitory computer-readable medium of claim 13, further comprising processor-executable instructions configured to cause the one or more processors to:

for each constraint:

for each segment:

provide, to a cross-encoder for each segment, the respective constraint and respective segment; and obtain a score for the respective constraint and respective segment; and associate one or more segments with each constraint based on the respective score.

15. The non-transitory computer-readable medium of claim 13, further comprising processor-executable instructions configured to cause the one or more processors to select one or more additional segments based on one or more selected segments.

16. The non-transitory computer-readable medium of claim 13, wherein the one or more constraints comprise one or more of a content constraint, a domain constraint, or a format constraint.

17. The non-transitory computer-readable medium of claim 13, further comprising processor-executable instructions configured to cause the one or more processors to:

determine one or more candidate constraints based on the one or more communication records;

generate a graphical user interface ("GUI") comprising one or more GUI elements corresponding to the one or more determined candidate constraints;

receive a selection of a subset of the one or more determined candidate constraints; and wherein the one or more constraints comprise the selected subset of the one or more determined candidate constraints.

* * * * *